United States Patent [19]
Miwa et al.

[11] Patent Number: 5,226,791
[45] Date of Patent: Jul. 13, 1993

[54] STRUCTURE OF A ROTOR SHAFT AND METHOD OF MAKING SAME

[75] Inventors: Yoshihisa Miwa, Hiroshima; Katsunori Hanakawa, Iwakuni, both of Japan

[73] Assignee: Mazda Motor Corporation, Hiroshima, Japan

[21] Appl. No.: 766,767

[22] Filed: Sep. 27, 1991

[30] Foreign Application Priority Data

Sep. 29, 1990 [JP] Japan .................. 2-262216
Sep. 29, 1990 [JP] Japan .................. 2-262217
Jul. 19, 1991 [JP] Japan .................. 3-179306

[51] Int. Cl.⁵ ............................... F04D 29/04
[52] U.S. Cl. ...................... 415/216.1; 418/179; 418/328; 418/112; 29/402.13; 29/402.16
[58] Field of Search ............ 415/216.1, 200; 29/402.13, 402.16, 402.18; 148/328, 127; 418/179

[56] References Cited

U.S. PATENT DOCUMENTS

| | | | |
|---|---|---|---|
| 1,745,854 | 2/1930 | Lawaczeck | 415/200 |
| 3,048,505 | 9/1962 | Doepken | 148/328 |
| 3,337,376 | 9/1967 | Grange | 148/328 |
| 3,470,037 | 10/1969 | Suzuki | 148/127 |
| 4,302,658 | 11/1981 | Beigay | 148/127 |
| 4,971,536 | 11/1990 | Takeda et al. | 415/216.1 |

FOREIGN PATENT DOCUMENTS

0632304 12/1961 Canada .................. 148/328
1-93338 6/1989 Japan .

Primary Examiner—Edward K. Look
Assistant Examiner—Mark Sgantzos
Attorney, Agent, or Firm—Wenderoth, Lind & Ponack

[57] ABSTRACT

In an apparatus accommodating a rotor of light alloy and a rotor shaft of steel secured to each other, the rotor shaft consists of a first shaft and a pair of second shafts integrally formed with or rigidly secured to the first shaft. The first shaft has a structure with a thermal coefficient of expansion close to that of the rotor whereas each of the second shafts has a structure with a thermal coefficient of expansion less than that of the first shaft.

3 Claims, 3 Drawing Sheets

STRUCTURE OF A ROTOR SHAFT AND METHOD OF MAKING SAME

BACKGROUND OF THE INVENTION

1. Field of the Invention

The present invention relates generally to an apparatus accommodating a rotor and a rotor shaft secured to each other, and more particularly to an improved rotor shaft for mounting a rotor of light alloy thereon and a method of making the rotor shaft.

2. Description of the Prior Art

Japanese Utility Model Laid-open Application (unexamined) No. 1-93338 discloses a mechanical super charger employing a screw compressor.

In this kind of super charger, two rotors are secured to respective rotor shafts and a pair of timing gears in mesh with each other are secured to the drive ends of the rotor shafts, respectively. Furthermore, a pulley is secured to one of the rotor shafts and is driven by a crank shaft of an engine for compression of intake air.

In this case, the rotor shafts are generally made of steel whereas the rotors are generally made of light alloy, for example aluminum alloy, to resist high speed rotation and to aim at weight-saving.

However, since aluminum alloy is greater in the thermal coefficient of expansion than steel, a unit accommodating a rotor of aluminum alloy securely mounted on a rotor shaft of steel is disadvantageous in that the difference in thermal expansion causes looseness of the rotor when they become warm, thus reducing the gripping force of the rotor with respect to the rotor shaft. As a result, there occasionally arises a problem in that seizing occurs on the rotor or the compressive force reduces.

In order to solve this problem, it is considered to make the thermal coefficient of expansion of the rotor shaft approximate to that of aluminum alloy for prevention of the looseness between the rotor and the rotor shaft. To this end, the rotor shaft is designed to have a high thermal coefficient of expansion by the use of steel containing the austenitic structure (for example, austempered steel, austenitic stainless steel, or the like).

However, bearings of steel carrying the rotor shaft cannot absorb large thermal expansion of the rotor shaft and the difference in thermal expansion between the rotor shaft and the bearings occasionally causes plastic deformation in the bearings when they become warm.

In the case of a rotor shaft of steel containing the austenitic structure, austenite transforms to martensite and the rotor shaft becomes hard during machining, thereby lowering the machinability thereof, for example, when thread cutting is performed with respect to an end or ends thereof.

SUMMARY OF THE INVENTION

The present invention has been developed to overcome the above-described disadvantages.

It is accordingly an object of the present invention to provide an improved rotor shaft on which a rotor of light alloy is securely mounted and which is capable of preventing the reduction in the gripping force of the rotor with respect to the rotor shaft without causing plastic deformation in bearings carrying the rotor shaft which may be caused by the difference in thermal expansion therebetween.

Another object of the present invention is to provide a method of making a rotor shaft of the abovedescribed type.

In accomplishing these and other objects, the rotor shaft according to the present invention comprises a first shaft having a structure with a thermal coefficient of expansion close to that of the rotor and a pair of second shafts carried by respective bearings and integrally formed with or rigidly secured to the first shaft. Each of the second shafts has a structure with a thermal coefficient of expansion less than that of the first shaft.

Preferably, the first shaft has a composite structure containing bainite and retained austenite of 20% or more by volume. In each of the second shafts, the structure with a thermal coefficient of expansion less than that of the first shaft is caused by the application of a heat treatment.

Advantageously, each of the second shafts has a composite structure containing bainite, ferrite, and cementite decomposed from the retained austenite.

The first and second shafts may be made of different steels. In this case, the first shaft can be made of a steel containing carbon of 0.7–1.1% by weight, silicon of 1.5–2.5% by weight, and manganese of 0.5–2.0% by weight and having a composite structure containing bainite and retained austenite of 20% or more by volume. Each of the second shafts can be made of a steel containing carbon of 0.6% or less by weight and silicon of 0.5% or less by weight and having a structure containing retained austenite of 10% or less by volume.

Conveniently, the first shaft is made of an austenitic stainless steel and each of the second shafts is made of a steel having a composite structure containing ferrite and pearlite.

In another aspect of the present invention, a method of making a rotor shaft comprises:

making a first shaft by the use of steel containing carbon of 0.7–1.1% by weight, silicon of 1.5–2.5% by weight, and manganese of 0.5–2.0% by weight;

making a pair of second shafts by the use of steel containing carbon of 0.6% or less by weight and silicon of 0.5% or less by weight;

welding the second shafts to opposite ends of the first shaft to make the rotor shaft; and austempering the entire rotor shaft.

The above-described chemical composition and the structure of the rotor shaft are based upon the following reasons.

(A) First Shaft

On retained austenite

Retained austenite is required to maintain the gripping force of the rotor with respect to the first shaft. If the amount of retained austenite is less than 20% by volume, a sufficient gripping force cannot be obtained.

On carbon

Carbon is required to ensure the hardenability, to make the retained austenite stable, and to delay bainite transformation. If the amount of carbon is less than 0.7% by weight, the retained austenite becomes unstable and the hardenability becomes insufficient. If the amount of carbon is greater than 1.1% by weight, there is a possibility of free carbon separating out. Preferably, the amount of carbon ranges from 0.7 to 1.1% by weight.

On silicon

Silicon has the effect of restraining carbide from separating out at the time of bainite transformation during an isothermal treatment and is an element required to produce stable retained austenite. If the amount of silicon is less than 1.5% by weight, the ability of restraining the separation of carbide becomes insufficient. If the amount of silicon exceeds 2.5% by weight, the effect saturates and there is a possibility of free carbon separating out during the heat treatment. Preferably, the amount of silicon ranges from 1.5 to 2.5% by weight.

On manganese

Manganese has the effect of enhancing the hardenability and of making retained austenite stable. If the amount of manganese is less than 0.5% by weight, the shaft becomes insufficient in strength and hardenability. If the amount of manganese exceeds 2.0% by weight, the effect saturates and it lowers the toughness of the shaft. Preferably, the amount of manganese ranges from 0.5 to 2.0% by weight.

(B) Second Shaft

On retained austenite

If the amount of retained austenite exceeds 10% by volume, plastic deformation would occur in the bearings.

On carbon

If the amount of carbon exceeds 0.6% by weight, those portions of the second shafts which were welded to the first shaft contain much carbon, thereby causing poor welding such as quenching cracks. Furthermore, since retained austenite more than 10% by volume is produced during austempering, there is a possibility of the occurrence of plastic deformation in the bearings.

On silicon

If the amount of silicon exceeds 0.5% by weight, retained austenite more than 10% by volume is produced during the austempering. Accordingly, there is a possibility of the occurrence of plastic deformation in the bearings.

According to the present invention, since the first shaft of the rotor shaft for mounting the rotor thereon has a thermal coefficient of expansion close to that of the rotor, the gripping force of the rotor with respect to the rotor shaft does not reduce even when they become warm. Accordingly, no looseness occurs between the rotor and the rotor shaft in all cases. Furthermore, since the second shafts of the rotor shaft have a thermal coefficient of expansion less than that of the first shaft, no plastic deformation occurs in the bearings. In addition, since the second shafts contain no retained austenite, deterioration in machinability which may be caused by martensite deformation is prevented.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
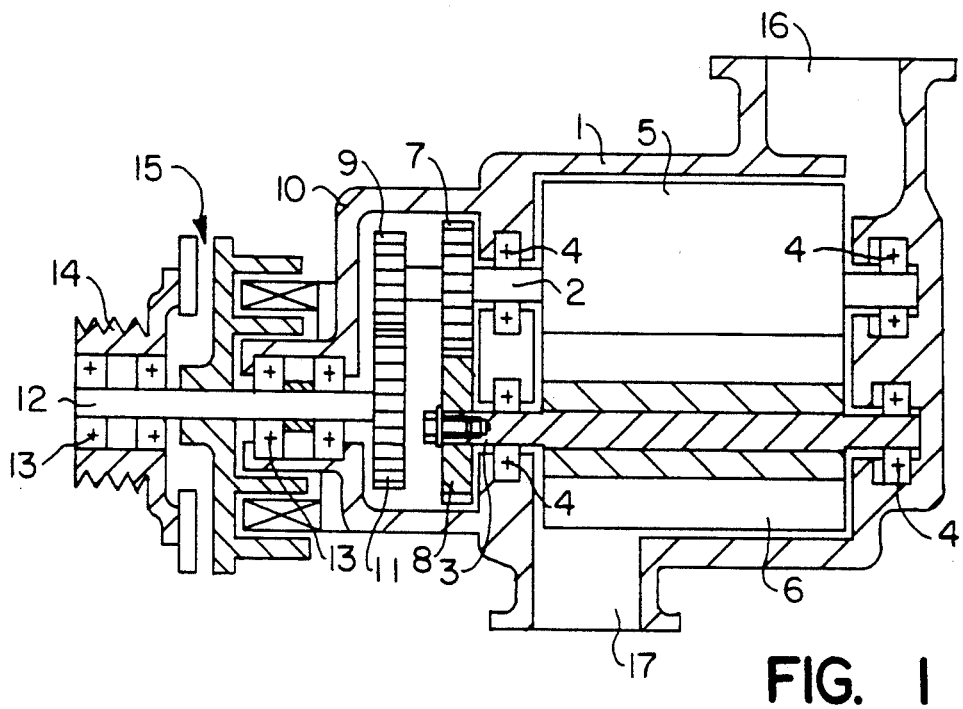
FIG. 1 is a vertical sectional view of a mechanical super charger embodying the present invention.

Referring now to the drawings, there is shown in FIG. 1 an apparatus accommodating a rotor and a rotor shaft secured to each other and embodying the present invention. The apparatus of FIG. 1 is a mechanical super charger for use in, for example, an automotive vehicle.

The mechanical super charger shown in FIG. 1 is of the screw type in which two rotor shafts 2 and 3 made of steel and journaled in respective bearings 4 are accommodated in a casing 1. The two rotor shafts 2 and 3 are arranged in parallel with each other, to which a male rotor 5 and a female rotor 6 are rigidly secured, respectively. Both the rotors 5 and 6 are made of aluminum alloy.

A timing gear 7 secured to the rotor shaft 2 is in mesh with a timing gear 8 secured to one end of the rotor shaft 3. The rotor shaft 2 extends through and beyond the timing gear 7 and has one end to which a step-up gear 9 is secured. This step-up gear 9 is in mesh with a step-up gear 11 secured to one end of a drive shaft 12 journaled in bearings 13. The step-up gear 11 is greater in diameter than the step-up gear 9. The casing 1 is provided with a front cover 10 in which the paired step-up gears 9 and 11 are accommodated and by which one of the bearings 13 is carried. A drive pulley 14 is secured to the other end of the drive shaft 12 so that the rotation of the drive pulley 14 may be transmitted to the drive shaft 12 via a magnetic clutch 15.

The rotational force transmitted to the drive pulley 14 from a crank shaft of an engine (not shown) is transmitted to the drive shaft 12 via the magnetic clutch 15 and to the male rotor 5 and the female rotor 6 via the step-up gears 11 and 9 and the timing gears 7 and 8.

Upon rotation of the male rotor 5 and the female rotor 6, air introduced in a suction port 16 of the casing 1 is compressed and then discharged from a discharge port 17 of the casing 1.

Figure 2:
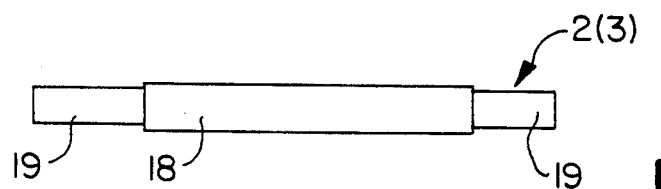
FIG. 2 is a front view of a rotor shaft accommodated in the super charger of FIG. 1.

FIG. 2 depicts the rotor shaft 2(3) having a rotor mount 18 on which the rotor 5(6) is securely mounted and opposite ends 19 to be journaled in respective bearings 4.

In this embodiment, a steel containing a required amount of C (carbon), Si (silicon), and Mn (manganese) was prepared as a material of the rotor shaft 2(3). After the steel was forged and stretched, it was cut into a shaft material of $\phi 27.5 \times 300$ mm. Thereafter, the material was austenitized at 890°–950° C.×120 min. and was then subjected to an isothermal transformation treatment at 380° C.×120 min. Furthermore, only the opposite ends 19 of the shaft material except the rotor mount 18 were subjected to a partial tempering treatment in a lead bath at 600° or 620° C.×10 min.

Table 1 shows six experimental examples which differ in chemical composition and conditions for heat treatment.

TABLE 1

| | Chem. Comp. (%) | | Austempering | | Tempering (10 min) |
|---|---|---|---|---|---|
| | C | Si | Mn | Austenitizing | Isothermal Transforma. | |
| Ex. 1 | 0.9 | 2.0 | 1.3 | 890° C. × 120 min | 380° C. × 120 min | 600° C. |
| Ex. 2 | | | | 920° C. × 120 min | 380° C. × 120 min | 600° C. |
| Ex. 3 | | | | 920° C. × 120 min | 380° C. × 120 min | 620° C. |
| Ex. 4 | | | | 950° C. × 120 min | 380° C. × 120 min | 600° C. |
| Ex. 5 | 0.8 | 2.0 | 1.0 | 890° C. × 120 min | 380° C. × 120 min | 600° C. |
| Ex. 6 | 1.0 | 2.0 | 1.5 | 890° C. × 120 min | 380° C. × 120 min | 600° C. |

In the rotor shaft 2(3) obtained in this way, the rotor mount 18 had a composite structure of bainite and retained austenite whereas the opposite ends 19 had a composite structure of bainite, cementite, and ferrite decomposed from the retained austenite.

Table 2 shows the results of measurement of the hardness (Hv) and the amount of retained austenite $V_\gamma$ (%) with respect to the rotor mount 18 and the opposite ends 19 of the rotor shaft 2(3) in the above experimental examples.

TABLE 2

| | Rotor Mount | | | Opposite Ends | | |
|---|---|---|---|---|---|---|
| | Structure | Hard (Hv) | $V_\gamma$ (%) | Structure | Hard (Hv) | $V_\gamma$ (%) |
| Ex. 1 | Bainite + | 350 | 53.1 | Bainite + | 342 | 0 |
| Ex. 2 | Retained | 347 | 51.3 | Cementite + | 339 | 0 |
| Ex. 3 | Austenite | 347 | 51.3 | Ferrite | 322 | 0 |
| Ex. 4 | | 355 | 54.8 | | 343 | 0 |
| Ex. 5 | | 361 | 41.2 | | 341 | 0 |
| Ex. 6 | | 340 | 62.5 | | 335 | 0 |

$V_\gamma$: the amount of retained austenite

When the retained austenite is decomposed at a low temperature, it becomes hard after the decomposition. In the above experimental examples, however, since the decomposition occurred at a relatively high temperature, the opposite ends 19 were restrained low in hardness, and therefore, these portions 19 are good in machinability.

Upon selection of the above experimental example 5 on behalf of all the examples, the metallic structure of the material thereof was enlarged by the use of a metallurgical microscope.

Figure 3:
FIGS. 3 and 4 are microscopic photographs indicative of the metallic structure of a rotor mount and one of the opposite end portions of the rotor shaft of FIG. 2, respectively, in one experimental example.
Figure 4:
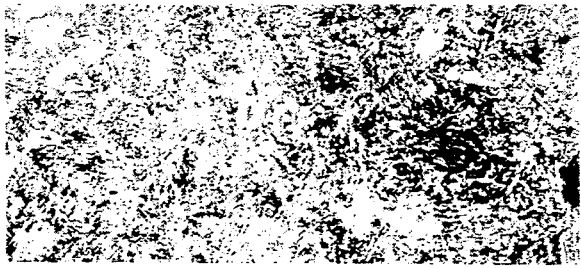

FIGS. 3 and 4 are microscopic photographs (magnification: 400 times) of the metallic structures of the rotor mount 18 and one of the opposite ends 19, respectively.

In the photograph of FIG. 3, white portions correspond to the retained austenite. It can be known from these photographs that the retained austenite were decomposed into cementite and ferrite in the opposite ends 19 and disappeared.

Table 3 shows two experimental examples in which the tempering treatment for the opposite ends 19 was performed at a lower temperature than in the above experimental examples 1 to 6.

TABLE 3

| | Chem. Comp. (%) | | | Austempering | | Tempering (10 min) |
|---|---|---|---|---|---|---|
| | C | Si | Mn | Austenitizing | Isothermal Transforma. | |
| Ex. 7 | 0.9 | 2.0 | 1.3 | 920° C. × 120 min | 380° C. × 120 min | 480° C. × 60 min |
| Ex. 8 | | | | 920° C. × 120 min | 380° C. × 120 min | 550° C. × 30 min |

Table 4 shows the measured values in the thermal coefficient of expansion of the rotor mount 18 and the opposite ends 19 in all the above experimental examples 1 to 8 shown in Tables 1 and 3. It can be known from Table 4 that the thermal coefficient of expansion of the rotor mount 18 was maintained high while that of the opposite ends 19 was restrained low.

TABLE 4

| | Thermal Coeffi. of Expansion (/°C.) (R.T.~200° C.) | |
|---|---|---|
| | Rotor Mount | Opposite Ends |
| Ex. 1 | $17.5 \times 10^{-6}$ | $13.0 \times 10^{-6}$ |
| Ex. 2 | $17.4 \times 10^{-6}$ | $12.5 \times 10^{-6}$ |
| Ex. 3 | $17.4 \times 10^{-6}$ | $12.0 \times 10^{-6}$ |
| Ex. 4 | $17.6 \times 10^{-6}$ | $12.8 \times 10^{-6}$ |
| Ex. 5 | $16.5 \times 10^{-6}$ | $12.9 \times 10^{-6}$ |
| Ex. 6 | $18.2 \times 10^{-6}$ | $12.1 \times 10^{-6}$ |
| Ex. 7 | $17.4 \times 10^{-6}$ | $12.4 \times 10^{-6}$ |
| Ex. 8 | $17.4 \times 10^{-6}$ | $12.3 \times 10^{-6}$ |

Preferably, the amount of retained austenite in the rotor mount 18 should be set to a value greater than 20% by volume in order to maintain the gripping force of the rotor 5(6) of aluminum alloy. This value (20% by volume) was determined as follows in consideration of the interference between the rotor 5(6) and the rotor shaft 2(3).

The materials obtained in the experimental examples 1 and 5 shown in Table 1 and those obtained in experimental examples 9 and 10 and comparison examples 1 and 2 shown in Table 5 were used as typical examples. Upon machining each of these materials into a shaft of ϕ20, the ratio between the amount of retained austenite (% by volume) and the interference relative to the shaft diameter (ΔD: a difference between the rotor diameter and the shaft diameter) was measured at a heating temperature of 200° C.

It is to be noted that Table 6 shows the amount of retained austenite and the thermal coefficient of expansion in the experimental examples 9 and 10 and the comparison examples 1 and 2.

TABLE 5

| | Chem. Comp. (%) | | | Austempering | |
|---|---|---|---|---|---|
| | C | Si | Mn | Austenitizing | Isothermal Transforma. |
| Ex. 9 | 0.9 | 2.0 | 1.3 | 920° C. × 120 min | 300° C. × 120 min |
| Ex. 10 | | | | 920° C. × 120 min | 350° C. × 120 min |
| Comp. Ex. 1 | | | | 920° C. × 120 min | 250° C. × 120 min |
| Comp. Ex. 2 | | | | — | |

TABLE 5-continued

| | Chem. Comp. (%) | | | Austempering | |
|---|---|---|---|---|---|
| | C | Si | Mn | Austenitizing | Isothermal Transforma. |
| Ex. 2 | | | | | |

TABLE 6

| | Hard. (Hv) | Retained Austenite Vγ(%) | Thermal Coeffi. of Expansion (/°C.) (R.T.~200° C.) |
|---|---|---|---|
| Ex. 9 | 712 | 26.7 | $14.9 \times 10^{-6}$ |
| Ex. 10 | 580 | 35.0 | $15.9 \times 10^{-6}$ |
| Comp. Ex. 1 | 760 | 15.0 | $13.8 \times 10^{-6}$ |
| Comp. Ex. 4 | 340 | 0 | $12.1 \times 10^{-6}$ |

In the above measurements, each of the rotors used in the experiments had a thermal coefficient of expansion of $17.5 \times 10^{-6}$ /° C.

Furthermore, the tolerance of the interference ΔD at the room temperature was rendered to be 0.14-0.20% based upon the machining tolerance capable of absorbing variations in size which would inevitably occur during the machining.

Figure 5:
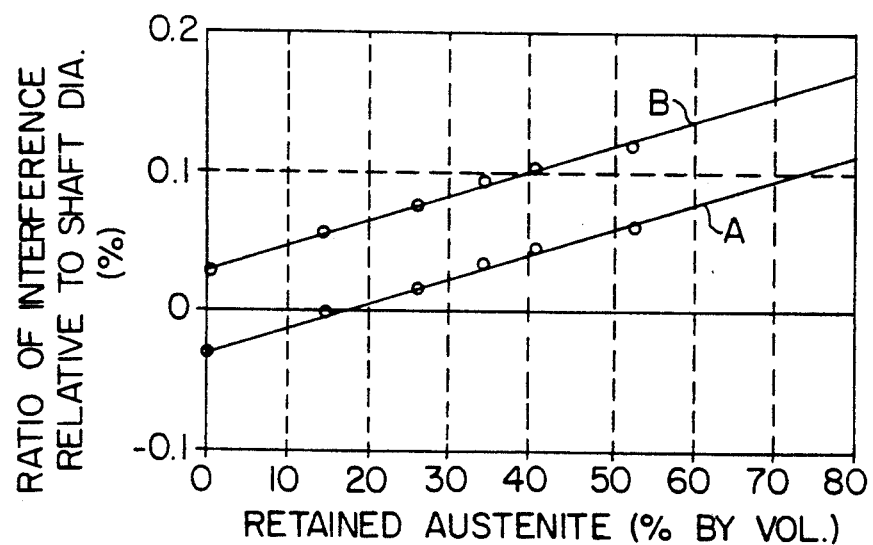
FIG. 5 is a graph indicative of the relationship between the amount of retained austenite and the interference between the rotor shaft and a rotor mounted thereon.

FIG. 5 depicts the results of measurements. In this figure, straight lines A and B correspond to the lower limit (0.14%) and the upper limit (0.20%) of the tolerance in the interference ΔD, respectively.

As is clear from the data of the above experimental examples and comparison examples, there is a correlation between the thermal coefficient of expansion and the amount of retained austenite. When the amount of retained austenite exceeds 20% by volume, the thermal coefficient of expansion exceeds $14.0 \times 10^{-6}$ /° C.

In the case of the experimental examples 1, 5, 9, and 10 containing retained austenite over 20% by volume, even when the tolerance of the interference ΔD was a value on the lower limit (0.14%: on the straight line A), the ratio of the interference relative to the shaft diameter did not lower below 0%, thus sufficiently maintaining the gripping force of the rotor 5(6) with respect to the rotor shaft 2(3) even after they became warm.

On the other hand, in the comparison examples 1 and 2 containing retained austenite below 20% by volume, the amount of thermal expansion of the rotor shaft was less than that of the rotor, and the interference ΔD therebetween at the time they were warm could not be sufficiently maintained. As a result, the ratio of the interference relative to the shaft diameter became less than 0% on the side of the lower limit (A) in the tolerance of the interference ΔD, and therefore, the gripping force of the rotor was lost. It can be known from this fact that the amount of retained austenite over 20% by volume is required.

As a result of evaluation with respect to the engagement between the rotor shafts and the rotors of aluminum alloy according to the aforementioned examples, no looseness in the engagement and no plastic deformation in the bearings 4 were discovered, and therefore, the desired end could be achieved in a super charger accommodating such rotors and rotor shafts.

Furthermore, both the machinability of the opposite ends 19 to be carried by the bearings and the productivity could be enhanced by decomposing the retained austenite.

According to the experimental examples 1 to 6, since the opposite ends 19 can be restrained low in hardness, the machinability are further enhanced.

On the other hand, according to the experimental examples 7 and 8, since the opposite ends 19 increase in hardness, the support strength thereof also increases.

It is to be noted here that the rotor shafts are made of steel in the above examples, they may be made of cast iron.

It is also to be noted that in the above examples, although a series of heat treatments were applied to the rotor shafts of one-piece construction to increase the thermal coefficient of expansion of the rotor mount thereof and to keep low that of the opposite ends thereof, a pair of stud shafts made of a material different from that of the rotor mount may be joined to opposite ends of the rotor mount to form a rotor shaft. In this case also, it is possible to make the rotor mount and the stud shafts differ in the thermal coefficient of expansion by applying heat treatments to the entire rotor shaft.

The present invention is further described hereinafter with reference to a rotor shaft having a first shaft on which a rotor is securely mounted and two second shafts joined to opposite ends of the first shaft for rotation together therewith.

In FIG. 2, reference numerals 18 and 19 correspond to the first shaft and the second shafts, respectively.

More specifically, the first shaft was made of steel containing C of 0.7-1.1% by weight, Si of 1.5-2.5% by weight, and Mn of 0.5-2.0% by weight whereas the second shafts were made of steel containing C of 0.6% or less by weight and Si of 0.5% or less by weight. After both the shafts were joined, an austempering treatment was applied thereto.

In the experimental example 11, two kinds of steels (A) and (B) having different chemical compositions as shown in Table 7 were initially prepared as materials of a rotor shaft 2(3). The material (A) was cut into a shaft material of $\phi 27.5 \times 150$ mm and the material (B) was welded thereto through a friction welding in which, upon fixing the material (A), friction was caused by rotating the material (B) at 2500 rpm and applying a pressure of 8 Kgf/mm² thereto for 3 seconds, and after the rotation was ceased, a pressure of 15 Kgf/mm² was further applied thereto. Thereafter, the rotor shaft obtained in this way was entirely austenitized at 920° C.×120 min and was then subjected to an isothermal transformation treatment at 380° C.×120 min.

TABLE 7

| | Chem. Comp. (%) | | | Austempering | |
|---|---|---|---|---|---|
| | C | Si | Mn | Austenitizing | Isothermal Transforma. |
| (A) | 0.9 | 2.0 | 1.3 | 920° C. × 120 min | 380° C. × 120 min |
| (B) | 0.45 | 0.21 | 1.8 | | |

Table 8 shows the structure, hardness, and the amount of retained austenite of the first shaft 18 and the second shafts 19 obtained in the above-described manner.

TABLE 8

| First Shaft | | | Second Shaft | | |
|---|---|---|---|---|---|
| Structure | Hard. (Hv) | Vγ (%) | Structure | Hard. (Hv) | Vγ (%) |
| Bainite + Retained | 347 | 51.3 | Pearlite | 264 | 0 |

TABLE 8-continued

| | First Shaft | | | Second Shaft | |
|---|---|---|---|---|---|
| Structure | Hard. (Hv) | Vγ (%) | Structure | Hard. (Hv) | Vγ (%) |
| Austenite | | | | | |

As shown in this table, since the first shaft 18 contained a high content of C and Si, an austempering treatment caused the first shaft 18 to have a composite structure of bainite and retained austenite. In contrast, since each of the second shafts 19 contained a low content of C and Si, the retained austenite disappeared and a pearlite structure was produced.

In this case, the thermal coefficient of expansion (R.T.~200° C.) of the first shaft 18 was $17.4 \times 10^{-6}$/°C.

From the above, it can be known that the second shafts 19 were restrained low in hardness as compared with the first shaft 18 and the thermal coefficient of expansion of the first shaft 18 was maintained high.

Figure 6:
FIGS. 6 and 7 are microscopic photographs similar to FIGS. 3 and 4 in another experimental example.
Figure 7:
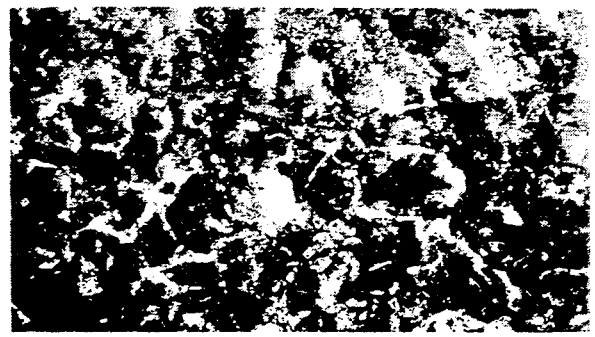

FIGS. 6 and 7 are microscopic photographs (magnification: 400 times) of the metallic structures of the first shaft 18 and one of the second shafts 19, respectively.

In the photograph of FIG. 6, white portions and acicular gray portions correspond to retained austenite and bainite, respectively. In the photograph of FIG. 7, black portions and white portions correspond to pearlite (ferrite×cementite) and ferrite, respectively.

Table 9 shows four additional experimental examples 12 to 15 in which the first shaft 18 differs in chemical composition and conditions for heat treatment. Table 10 shows the results of measurement in the hardness, the amount of retained austenite, and the thermal coefficient of expansion (R.T.~200° C.) of the first shaft 18.

As is apparent from FIG. 5, in these experimental examples also, it is preferable to set the amount of retained austenite in the first shaft 18 to a value over 20% by volume in order to maintain the gripping force of the rotor with respect thereto.

It is also preferable to set the thermal coefficient of expansion of the second shafts 19 to a value less than $13.5 \times 10^{-6}$/° C. The reason for this is that if the thermal coefficient of expansion of the second shafts 19 exceeds this value, plastic deformation may occur in the bearings.

TABLE 9

| | Chem. Comp. (%) | | | Austempering | |
|---|---|---|---|---|---|
| | C | Si | Mn | Austenitizing | Isothermal Transforma. |
| Ex. 12 | 0.9 | 2.0 | 1.3 | 890° C. × 120 min | 380° C. × 120 min |
| Ex. 13 | | | | 950° C. × 120 min | 380° C. × 120 min |
| Ex. 14 | 0.8 | 2.0 | 1.0 | 890° C. × 120 min | 380° C. × 120 min |
| Ex. 15 | 1.0 | 2.0 | 1.5 | 890° C. × 120 min | 380° C. × 120 min |

TABLE 10

| | Hard. (Hv) | Vγ(%) | Thermal Coeffi. of Expansion (/°C.) |
|---|---|---|---|
| Comp. Ex. 12 | 350 | 53.1 | $17.5 \times 10^{-6}$ |
| Comp. Ex. 13 | 355 | 54.8 | $17.6 \times 10^{-6}$ |
| Comp. Ex. 14 | 361 | 41.2 | $16.5 \times 10^{-6}$ |
| Comp. Ex. 15 | 340 | 62.5 | $18.2 \times 10^{-6}$ |

Table 10

Tables 11 and 12 shows comparison examples 3 and 4 in which the chemical composition in the first shaft 18 is out of the above-prescribed range and comparison examples 5 and 6 in which the chemical composition in the second shafts 19 is out of the above-prescribed range.

TABLE 11

| | Chem. Comp. (%) | | | Austempering | |
|---|---|---|---|---|---|
| | C | Si | Mn | Austenitizing | Isothermal Transforma. |
| Comp. Ex. 3 | 0.32 | 1.82 | 1.32 | 920° C. × 120 min | 380° C. × 120 min |
| Comp. Ex. 4 | 0.73 | 0.18 | 0.68 | 920° C. × 120 min | 380° C. × 120 min |
| Comp. Ex. 5 | 0.59 | 2.08 | 0.89 | 920° C. × 120 min | 380° C. × 120 min |
| Comp. Ex. 6 | 0.88 | 0.18 | 0.69 | 920° C. × 120 min | 380° C. × 120 min |

TABLE 12

| | Hard. (Hv) | Vγ(%) | Thermal Coeffi. of Expansion (/°C.) |
|---|---|---|---|
| Comp. Ex. 12 | 281 | 7.3 | $13.5 \times 10^{-6}$ |
| Comp. Ex. 13 | 330 | 0 | $12.5 \times 10^{-6}$ |
| Comp. Ex. 14 | 359 | 25.9 | $14.7 \times 10^{-6}$ |
| Comp. Ex. 15 | 346 | 0 | $12.6 \times 10^{-6}$ |

In the comparison example 3, since the content of C is low, the amount of retained austenite is small. Accordingly, the gripping force of the rotor 2(3) with respect to the first shaft 18 reduces when they are warm.

In the comparison example 4, since the content of Si is low, the austempering treatment can produce no retained austenite, thus reducing the gripping force of the rotor 2(3) with respect to the first shaft 18 when they are warm.

In the comparison example 5, since the content of Si is high, the amount of retained austenite exceeds 10% by volume. As a result, the difference in thermal expansion between the second shafts 19 and the bearings 4 at the time they are warm causes plastic deformation in the bearings 4.

Furthermore, in the comparison example 6, since the content of C is high, there arises a problem in that the so-called quenching crack may occur when the first shaft 18 and the second shafts 19 are welded to each other.

In the meantime, upon engagement of a rotor of aluminum alloy with the rotor shaft according to the above experimental examples 11 to 15, there arose neither looseness nor seizing on the first shaft 18. Also, no plastic deformation occurred in the bearings 4, and the desired compressive force could be obtained in a super charger employing such a rotor.

In addition, the second shafts 19 could be improved in machinability.

It is to be noted here that in the above experimental examples, the friction welding was employed as a method of welding the first and second shafts, laser welding, electron beam welding, or the like may also be employed.

It is also to be noted that in the above experimental examples, although a heat treatment was applied to the entire rotor shaft after the first and second shafts 18 and 19 were joined to each other, the heat treatment can be eliminated by making use of austenitic stainless steel for the first shaft 18.

A further example is discussed hereinafter.

Table 13 shows the experimental example 16 in which austenitic stainless steel (JIS:SUS304) and carbon steel (JIS:S43C) were prepared for the rotor shaft 2(3). The austenitic stainless steel (C) was cut into a shaft material of φ27.5×150 mm and the material (D) was welded thereto through a friction welding in which, upon fixing the material (C), friction was caused by rotating the material (D) at 1500 rpm and applying a pressure of 16 Kgf/mm$^2$ thereto for 3 seconds, and after the rotation was ceased, a pressure of about 32 Kgf/mm$^2$ was further applied thereto. Thereafter, the rotor shaft obtained in this way was machined into a desired configuration.

The rotor shaft in this experimental example was produced by joining the first shaft 18 containing the material (C) and the second shafts 19 containing the material (D).

TABLE 13

| | Kind of Steel | | |
|---|---|---|---|
| (C) | Austenitic Stainless Steel (JIS: SUS304) | | |
| (D) | Carbon Steel (JIS: S43C) Chemi. Comp. (%) | | |
| | C | Si | Mn |
| | 0.42 | 0.18 | 0.69 |

Table 14 shows the structure, hardness, and the thermal coefficient of expansion of the first shaft 18 which is to engage with a rotor and the second shafts 19 which are to be carried by respective bearings.

TABLE 14

| | Structure | Hard. (Hv) | Thermal Coeffi. of Expansion (/°C.) (R.T.~200° C.) |
|---|---|---|---|
| First Shaft | Austenite | 200 | 17.3 × 10$^{-6}$ |
| Second Shaft | Ferrite + Pearlite | 195 | 12.3 × 10$^{-6}$ |

As shown in this table, the first shaft 18 of the rotor shaft 2(3) exhibited the austenitic structure and had a high thermal coefficient of expansion close to the thermal coefficient of expansion of a rotor of light alloy. On the other hand, the second shafts 19 exhibited a structure containing both ferrite and pearlite and was restrained low in the thermal coefficient of expansion as compared with the first shaft 18.

Upon engagement of the rotor shaft according to the experimental example 16 with a rotor of aluminum alloy, the desired compressive force could be obtained in a super charger without the occurrence of looseness between the rotor and the rotor shaft, seizing of the rotor, and plastic deformation in the bearings.

Moreover, because the hardness was not high, it was relatively easy to finish pin holes required for fixing the rotor and to machine the rotor shaft.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. In an apparatus accommodating a rotor of light alloy and a rotor shaft of steel secured to each other, said rotor shaft comprising:

a first shaft having a structure with a thermal coefficient of expansion close to that of the rotor for mounting the rotor thereon; and a pair of second shafts adapted to be carried by respective bearings and integrally formed with and rigidly secured to said first shaft, each of said second shafts having a structure with a thermal coefficient of expansion less than that of said first shaft and wherein said first and second shafts are made of different steels and wherein said first shaft is made of a steel containing carbon of 0.7-1.1% by weight, silicon of 1.5-2.5% by weight, and manganese of 0.5-2.0% by weight and having a composite structure containing bainite and retained austenite of 20% or more by volume, and each of said second shafts is made of a steel containing carbon of 0.6% or less by weight and silicon of 0.5% or less by weight and having a structure containing retained austenite of 10% or less by volume.

2. A method of making a rotor shaft on which a rotor of light alloy is securely mounted, said method comprising the steps of:

making a first shaft by the use of steel containing carbon of 0.7-1.1% by weight, silicon of 1.5-2.5% by weight, and manganese of 0.5-2.0% by weight;

making a pair of second shafts by the use of steel containing carbon of 0.6% or less by weight and silicon of 0.5% or less by weight;

welding said second shafts to opposite ends of said first shaft to make the rotor shaft; and austempering the entire rotor shaft.

3. In an apparatus accommodating a rotor of light alloy and a rotor shaft of steel secured to each other, said rotor shaft comprising:

a first shaft having a structure with a thermal coefficient of expansion close to that of the rotor for mounting the rotor thereon; and a pair of second shafts adapted to be carried by respective bearings and rigidly secured to said first shaft, each of said second shafts having a structure with a thermal coefficient of expansion less than that of said first shaft and wherein said first and second shafts are made of different steels and wherein said first shaft is made of a steel containing carbon of 0.7-1.1% by weight, silicon of 1.5-2.5% by weight, and manganese of 0.5-2.0% by weight and having a composite structure containing bainite and retained austenite of 20% or more by volume, and each of said second shafts is made of a steel containing carbon of 0.6% or less by weight and silicon of 0.5% or less by weight and having a structure containing retained austenite of 10% or less by volume.

* * * * *